United States Patent [19]

Siebert

[11] Patent Number: 5,291,332
[45] Date of Patent: Mar. 1, 1994

[54] ETALONS WITH DISPERSIVE COATINGS

[75] Inventor: Edward T. Siebert, New Fairfield, Conn.

[73] Assignee: Hughes Aircraft Company, Los Angeles, Calif.

[21] Appl. No.: 857,367

[22] Filed: Mar. 25, 1992

[51] Int. Cl.⁵ .......................... G02B 5/28; G02B 1/10; G01B 9/02
[52] U.S. Cl. ................................. 359/589; 359/586; 356/352
[58] Field of Search ........................ 359/586, 587, 589; 356/352

[56] References Cited

U.S. PATENT DOCUMENTS

| | | | |
|---|---|---|---|
| 4,170,416 | 10/1979 | Fencil | 356/346 |
| 4,377,324 | 3/1983 | Durand et al. | 359/589 |
| 4,536,089 | 8/1985 | Siebert | 356/352 |
| 4,547,801 | 10/1985 | Haisma et al. | 359/589 |
| 4,583,822 | 4/1986 | Southwell | 350/164 |
| 4,609,822 | 9/1986 | Roche | 250/352 |
| 4,925,259 | 5/1990 | Emmett | 359/359 |
| 4,952,025 | 8/1990 | Gunning, III | 350/164 |
| 4,968,117 | 11/1990 | Chern et al. | 359/589 |

FOREIGN PATENT DOCUMENTS

| | | | |
|---|---|---|---|
| 8501115 | 3/1985 | PCT Int'l Appl. | G02B 1/10 |
| 9002964 | 3/1990 | PCT Int'l Appl. | G02B 5/26 |
| 90/10246 | 9/1990 | PCT Int'l Appl. | 356/352 |

*Primary Examiner*—Bruce Y. Arnold
*Assistant Examiner*—Darryl Collins
*Attorney, Agent, or Firm*—Michael W. Sales; Wanda K. Denson-Low

[57] ABSTRACT

An etalon (10) is provided with a coating (12) so as to selectively pass spectral lines of interest. The etalon includes a substrate (14) having a first major surface and a second, opposite major surface. The etalon further includes a coating, preferably a rugate coating (12), formed upon at least one of the major surfaces. The rugate coating has a spatially varying index of refraction profile through a depth thereof. The profile is selected so as to provide the element with a prescribed dispersion characteristic that matches a dispersion characteristic of a source of the radiation signal.

5 Claims, 4 Drawing Sheets

ETALONS WITH DISPERSIVE COATINGS

CROSS REFERENCE TO RELATED PATENT APPLICATIONS

This patent application is related to commonly assigned U.S. patent application Ser. No. 07/857,345, filed on even date herewith, entitled "Improved Coatings for Laser Detector Etalons". by E. T. Siebert and S. J. Kishner and to commonly assigned U.S. patent application Ser. No. 07/887,007, filed on even date herewith, entitled "Dispersive Rugate Coatings", by E. T. Siebert.

FIELD OF THE INVENTION

This invention relates generally to optical devices and, in particular, to coatings for etalons.

BACKGROUND OF THE INVENTION

The use of narrowband Fabry Perot etalons for spectral analysis is known in the art, as evidenced by those described by R. Russel Austin in "Solid Fabry-Perot Etalons as Narrow Band Filters" (Electro Optical System Design, 6, 32, July 1973, pp. 32-37), Adrian E. Roche and Alan M. Title in "Ultra Narrow Band Infrared Filter Radiometry", Second Joint Conference on Sensing Atmospheric Pollutants, -ISA-JSP 6656, Washington D.C., Dec. 10-12, 1973, pp. 21-24. Narrowband etalons are used in such applications as Fraunhofer Line Discriminators, as described in "The Fraunhofer Line Discriminator MK II" by James A. Plascyk and Fred C. Gabriel (IEEE Transactions on Instrumentation and Measurement, Vol. IM-24, No. 4, December, 1975, pp. 306-313), and in the Hydrogen Alpha Telescope launched by NASA.

Most prior art Fabry Perot etalons filter out only a single, narrowband line. However, since the etalon exhibits a periodic channel spectrum the periodicity of channel spectra can be matched to nearly periodic spectra over a narrow spectral region. When the source spectra is notably aperiodic, the etalon can be matched to only two lines. Furthermore, if the source lines are widely separated, degradations in the etalon finesse typically allow the etalon to be used for only one line. One common example concerns the Fraunhofer lines in the atmosphere. These lines are not only aperiodic, but are also widely spaced apart. Therefore, three separate etalons were required to be used in the Fraunhofer Line Discriminator referred to above.

As employed herein, the term "etalon" is intended to encompass an optical device or element having two partially reflecting surfaces that are parallel to each other to optical tolerances. The space between the two reflecting coatings can be air or an optical material, and can be thick or thin. The thicker the spacer, the higher the resolution of the etalon. FIG. 1a shows a "solid" etalon where the spacer is a thick optical material labeled substrate. When the spacer is solid and thin, the etalon assumes the form of an interference filter.

FIG. 1a illustrates a flat multi-line etalon 1 comprised of a spacer material, or substrate 2, and coatings 3 and 4. The transmission characteristics of the etalon I are designed to be nominally matched to atmospheric or laser spectral lines. FIG. 1b illustrates the periodic spectral lines passed by the etalon 1 (transmission peaks) and also illustrates typical aperiodic atmospheric spectral lines. The prior art etalon 1 does not exhibit dispersion ($\phi = 0$). That is, the prior art etalon does not generate phase shifts as a function of wavelength. As used here, dispersion in an etalon coating is defined as a variation of phase shift upon reflection with wavelength, frequency or period. As a result, the periodic etalon "walks off" of the aperiodic atmospheric spectral lines, which are affected by molecular dispersion. This results in a failure of the etalon 1 to pass the atmospheric lines of interest and a resulting failure to detect the presence of these lines.

Alternately, one can broaden the width of the filter lines to pass the molecular lines, but this degrades the effectiveness of the filter.

In greater detail, a high finesse etalon produces multiple transmission peaks whose locations are given by:

$$\phi + \pi = 2\Psi l; \text{ where}$$

$\Psi = 2kd = 4\ nd\pi \cos\theta'/\lambda$ = phase of etalon spacer;
$l$ = integer;
$n, d, \theta'$ = etalon index of refraction, thickness, and internal angle, respectively;
$\lambda$ = wavelength of Nth peak; and
$\phi$ = the phase of the etalon coating.

The etalon "finesse" is a measure of etalon quality and may be expressed as a ratio of line spacing to line width. In other words, the etalon finesse is a function of etalon reflectivity so that as reflectivity increases, so does the finesse.

Once the etalon 1 spacer material 2 is chosen, the index of refraction and internal angle are determined. The wavelengths of the desired transmission peaks are assumed to be given a priority. The etalon 1 thickness is chosen so as to set the free spectral range and to locate one line, or transmission peak. However, if the lines are not periodic the etalon, having a non-dispersive coating, can be matched to only two lines.

It is thus one object of the invention to provide a dispersive coating to specify the transmission peak characteristics of a multiple transmission peak (multi-peak) etalon.

It is another object of the invention to provide improved coatings for multi-peak etalons, the coating providing a controlled and prescribed dispersion characteristic for an etalon, even when the peaks are far apart.

Another object of the invention is to provide a dispersive rugate coating fabricated so as to define the transmission peak characteristics of a multi-peak etalon.

SUMMARY OF THE INVENTION

The foregoing and other problems are overcome and the objects of the invention are realized by a multi-peak etalon having a prescribed dispersion. Specifically, there is described an embodiment of a multi-peak etalon having a prescribed dispersion to compensate for unwanted dispersion in the etalon itself and/or to add dispersion such that the etalon dispersion and the coating dispersion together match that of the spectral lines to be passed. In one embodiment, phase shifts are put into rugate coatings on a per wavelength basis by adjusting the phase of the rugate sine wave for each wavelength that is desired to be passed. The rugate coating may be a summation of individual rugate index sine waves, for widely separated spectral lines, or an integration of the individual index sine waves for spectral lines within a relatively narrow band. In a second embodiment, a dispersive coating is designed by iterative techniques.

In one embodiment, the etalon is provided a dispersion characteristic that matches a molecular dispersion of a species to be detected. That is, the etalon transmission peaks match those of the species so as to prevent "walk off". Beneficially, the etalon is enabled to pass more lines than etalons of the prior art, or narrower bandwidth filters may be provided. There are also described etalon filters that simultaneously pass a number of unrelated lines, such as, by example, the Fraunhofer lines in the sun. There is also described an optical element, for use in an interferometer, having a prescribed dispersion to control fringe shifts as a function of wavelength.

In addition, the invention teaches two methods of designing the dispersion coatings. A first method employs a rugate coating technology in which the phase of the rugate is controlled to provide the desired result. A second method employs an iterative coating technique in which a coating having the desired properties is generated by successive approximations using a nominal starting point and standard coating optimization routines.

The invention extends the use of a rugate coating to provide a controlled and prescribed dispersion characteristic for an etalon. An important factor in designing such a dispersive rugate coating is shown to be a realization that in a rugate the phase shift on reflection is directly related to the phase of a sinusoidal index of refraction profile within the rugate coating, while the frequency of the sinusoidal index of refraction profile determines the wavelength at which the phase shift occurs. Thus, by changing the phase of the sinusoidal index of refraction variation as the period of the sinusoidal index of refraction variation is changed, a phase shift of incident radiation is produced that is a function of the wavelength of the incident radiation. When this phase shift varies with wavelength, the coating is referred to as a dispersive coating.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

Reference is made to an article entitled "Spectral Response Calculations of Rugate Filters Using Coupled-wave Theory", by W. H. Southwell, Journal of the Optical Society of America, Vol. 5(9), 1558-1564(1988). This article discusses gradient-index interference filter coatings having an index of refraction that varies in a sinusoidal fashion (rugate) in a direction normal to a substrate. A narrow bandwidth reflector is shown to be achieved with a rugate coating, the bandwidth being proportional to the fractional index change.

While the ensuing description is limited to the case of normal incidence, for simplicity, the results are readily extended to non-normal incidence, as shown by Southwell. The ensuing description is also limited, for simplicity, to the case where the reflectivities at the coating surfaces are nominally zero, i.e., the coating is matched to abutting media by standard anti-reflection techniques such as the matching edges shown in FIG. 3. The formulas for the general case are given in Southwell. Note that one can simply solve the general formulas for the intrinsic coating properties and proceed as shown in the text.

Figure 3:
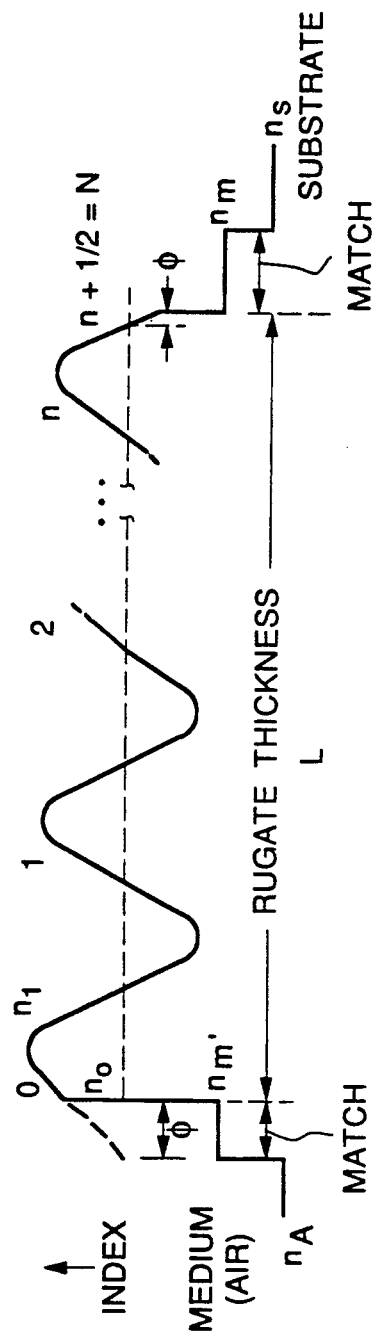
FIG. 3 is a graph illustrating an index of refraction profile for a rugate as a function of thickness.

In FIG. 3 there is shown an exemplary rugate index of refraction profile. In FIG. 3, the substrate is on the right, light is incident from the left, $n_s$ is the index of refraction of the substrate, $n_A$ is the index of refraction of the incident medium, typically air, $n_o$ is the average index of refraction through the rugate, and $n_1$ is the peak index of refraction variation, which is typically small compared with $n_o$. Phi ($\phi$) is the starting or initial phase of the index of refraction variation.

The word rugate, when used as a noun, is herein intended to define a gradient-index interference filter whose index of refraction profile is a sine wave. When used as an adjective, the word rugate is herein taken to describe the sine-wave index of refraction profile of a coating.

The invention extends the use of a rugate coating to provide a change in phase with wavelength for an etalon. That is, the phase is made dispersive. An important factor in designing such a dispersive rugate coating is a realization that in a rugate the phase shift on reflection is directly related to the phase of a sinusoidal index of refraction profile within the rugate coating, while the frequency of the sinusoidal index of refraction profile determines the wavelength at which the phase shift occurs. Thus, by changing the phase of the sinusoidal index of refraction variation as the period of the sinusoidal index of refraction variation is changed, a phase shift of incident radiation is produced that is a function of the wavelength of the incident radiation.

Figure 4A:
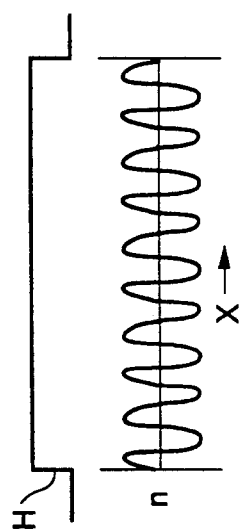
FIG. 4a illustrates a rugate for use with a single wavelength.

For a single wavelength and normal incidence a rugate has an index of refraction (index) profile of:

$$n = n_o + n_1 \sin(Kx + \phi), \quad K = (4\pi n_o/\lambda), \qquad (1)$$

where $n_o$ is an average index, $n_1$ is a peak index variation, K determines a wavelength $\lambda$ for which maximum reflection occurs, $\phi$ is a starting phase of the index variation, and x is a thickness within a range of $(0 \leq x \leq L)$. The amplitude reflectance (r) produced by this profile when properly terminated, i.e., as described in the Southwell reference is:

$$r = \tanh(u/4) \exp(i\phi)$$

$$R = |r|^2 = \text{Intensity Reflectivity}$$

$$u = KLn_1/n_o = 2\pi N n_1/n_o. \qquad (2)$$

where $\Delta\lambda/\lambda = n_1/n_o$ is a fractional bandwidth, where N is a number of cycles in the coating, normally half integer, and L is the physical thickness of the coating. It can be seen that the maximum reflectivity is determined by the product of the fractional index variation times the number of cycles, while the phase shift on reflection is given by the phase shift of the index profile, $\phi$. The foregoing analysis provides a basis for a rugate design for use with a single wavelength, as depicted in FIG. 4a.

Figure 4B:
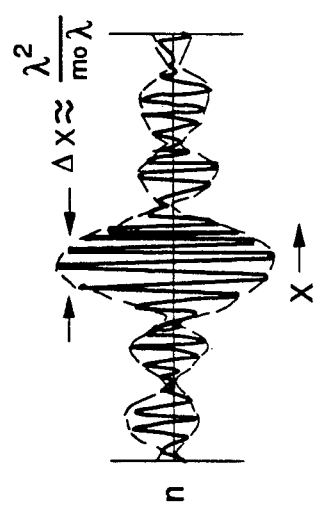
FIG. 4b illustrates a rugate for use with a band of wavelengths.

For multiple wavelengths which are widely separated ($\lambda_i - \lambda_j \Delta >> \lambda$), a rugate may be obtained for each wavelength by summing the index profiles:

$$n(x) = n_o + \Sigma n_i \sin(K_i x + \phi_i) H((n_i K(x-x_o))/(n_o u_i)) \quad (3)$$

as is shown in FIG. 4b. That is, the individual rugate sine waves are added together so as to produce a complex waveform shape that describes the required index of refraction variation within the coating. H is an envelop function that defines the extent of the coating. As shown in FIG. 3, H is a square aperture so that $H(t) = 1$ if $0 \leq t \leq 1$ and zero otherwise ($t = X/L$). More generally, H can be any function of finite extent. In particular, it is usually desirable to pick H so as to minimize the sidelobes around the reflection band. This is called apedization. Above, L has been expressed in terms of u to relate L to reflectivity through equation 2.

To design a rugate over a continuous wavelength band, the sum of Eq. (3) is replaced by an integral:

$$n(x) = n_o[1 + \int H(n_i K(x - x_o) / n_o u(K)) \sin(Kx + \phi(K)) dK/K], \quad (4)$$

where $n_o$ is equal to the average index of refraction, $K = 4\pi n_o/\lambda$, $\theta'$ is the internal angle in the coating and $\lambda$ is the wavelength, where $u(K) = 4\tanh^{-1}[R(K)]^{\frac{1}{2}}$ is a number of cycles in the coating to achieve a desired reflectivity $R(K)$, n is the peak deviation of the index from $n_o$ for a single wavelength, where $\phi(K)$ is the phase of reflected light as a function of K, where x is a distance into the coating, and where H is an envelope or apedizing function located at $x_o$ whose extent defines the region of index variation at the wavelength $\lambda$. In equation 4, $DK/\Delta K = dKn_o/n_1 K$ to go from a sum to an integral.

Figure 4C:
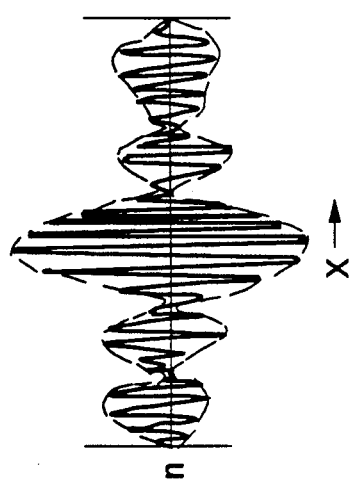
FIG. 4c illustrates a rugate truncated at nulls of an envelope.

When $n_1$ is constant and $\phi$ is constant or linear in K (that is, same reflectivity at all wavelengths and no dispersion), $\Delta K$ is small and $H = 1$, the integral gives:

$$n(x) = n_o + n_1(\Delta K / \overline{K}) \sin(\overline{K} x + \phi) \operatorname{sinc}[(x + \phi')\Delta K/2], \quad (5)$$

where $\phi'$ is the derivative of $\phi$ with respect to K (assumed to be constant or zero), and $\overline{K}, \phi$ are the average values of $K, \phi$. This is similar to the aforedescribed case for a single wavelength, except that the sine wave is multiplied by an additional envelope (the sinc function) which limits the envelope extent to $\Delta x \pi 2\lambda / \Delta K = (\lambda)^2/2(n_o)\Delta\lambda$. As the spectral bandwidth increases, the region wherein the index varies significantly becomes smaller. It is possible to truncate this envelope, which is technically larger than L, as seen in FIG. 4c. The rugate parameters are chosen such that the phase shift over $\Delta\lambda$ is small.

Even when $\phi$ is slightly dispersive, Eq. (5) remains approximately valid with $\phi$ replaced by $\phi(K)$, so that the same conclusions hold.

Referring to FIGS. 4a-4c, based upon the foregoing, a technique for specifying a dispersive rugate coating over an extended spectral region is now provided.

Using the desired dispersion and reflectivities for a given application Eq. (1), (3), or (4) is used to determine a nominal coating design, along with equation 2 which relates $u, \phi$ to the desired complex reflectance. The envelope may be truncated (usually at a zero of the sinc function) or apedized to limit it to a finite region. Truncation is limited by the fractional bandwidth required, and the number of cycles required, to obtain the reflectivity and $n_i$ is chosen so that the phase shift change is small in $\Delta\lambda$. The design may be iterated, if necessary, to eliminate truncation, sidelobe, and end matching effects. It is also within the scope of the invention to convert the resulting graded index specification into a discrete multilayer embodiment, using standard techniques.

Figure 2B:
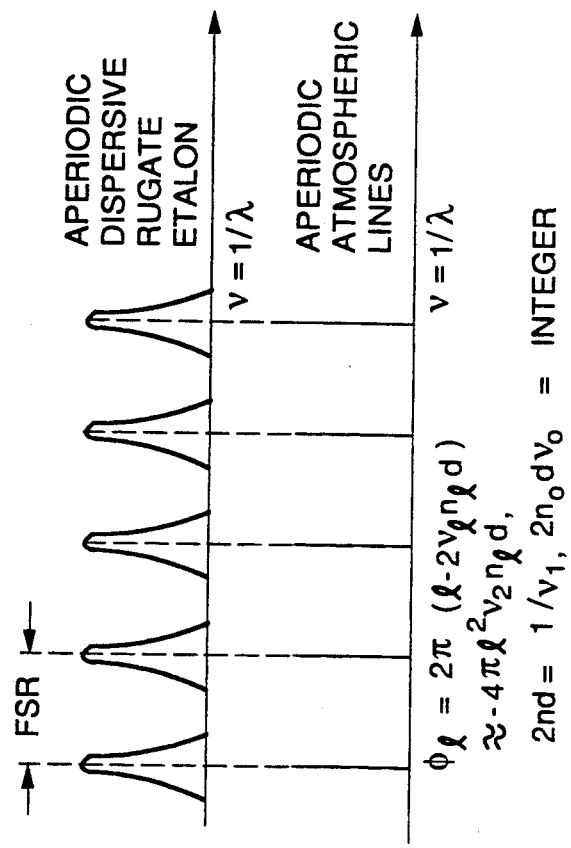
FIG. 2b illustrates transmission peaks of the etalon of FIG. 2a being matched to aperiodic atmospheric spectral lines.
Figure 2A:
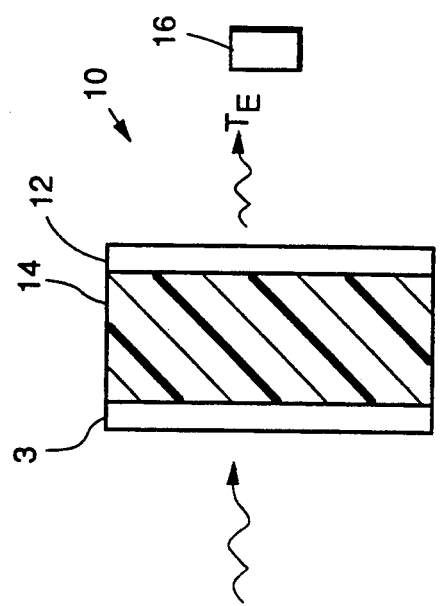
FIG. 2a shows an etalon constructed so as to have a prescribed dispersion characteristic.

FIG. 2a shows an etalon 10 constructed so as to have a prescribed dispersion characteristic, the prescribed dispersion characteristic being provided by a rugate coating 12 that is applied to at least one major surface of a spacer material, or substrate 14. Radiation is incident upon the opposite major surface. If the one rugate coating 12 is applied, as shown, the opposite major surface is coated with a conventional etalon coating 3, and the one rugate coating 12 compensates for the dispersion of the coating 3 and the substrate 14. However, a single rugate coating may be specified so as to compensate the dispersion of the substrate 14, and this rugate coating is then applied to both major surfaces in such a manner that each coating contributes a portion, such as one-half, of the required prescribed dispersion. A radiation detector 16 is disposed for detecting a presence of the radiation having wavelengths of interest.

Figure 1B:
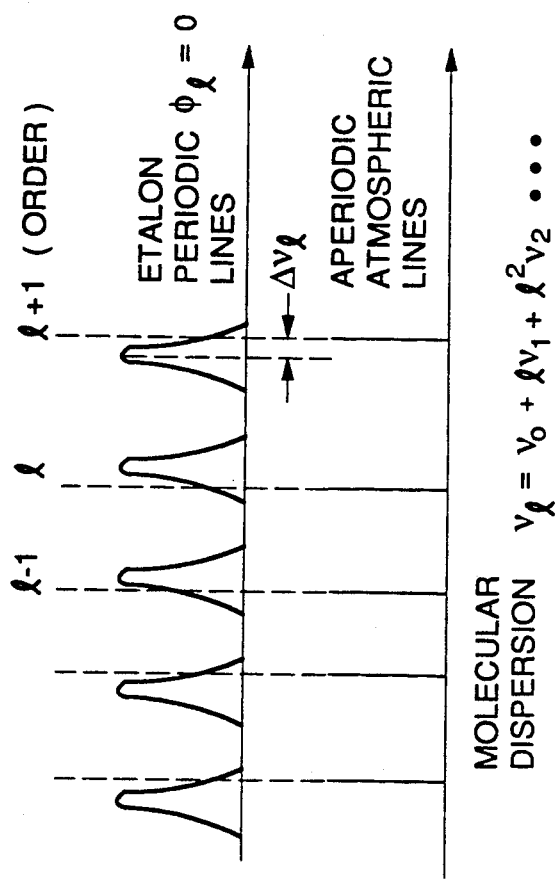
FIG. 1b illustrates etalon transmission peaks in relation to aperiodic atmospheric spectral lines.
Figure 1A:
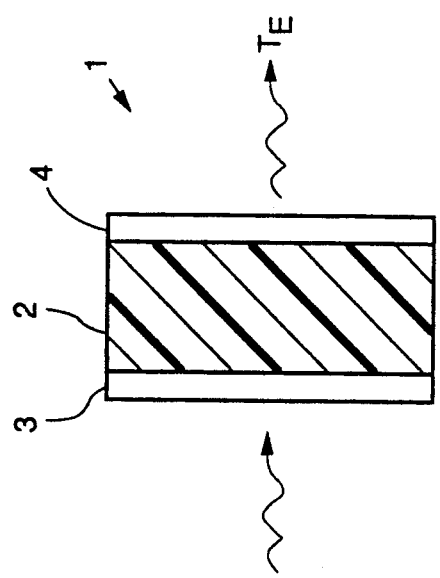
FIG. 1a shows an etalon of the prior art.

FIG. 2b illustrates transmission peaks of the etalon of FIG. 2a being matched to aperiodic atmospheric spectral lines. A comparison of FIG. 2b to FIG. 1b shows that the etalon 10 transmission characteristic is matched to the dispersion characteristic of the source of radiation $\nu_l = \nu_0 + \nu_1 l + \nu_2 l^2 + \ldots$, and that dispersion induced by molecular species in the source and/or transmission medium are compensated for. It is also within the scope of the invention to match the etalon 10 transmission characteristic to, for example, a plurality of unrelated spectral lines, such as the Fraunhofer lines in the sun. It is also within the scope of the invention to match the etalon 10 transmission characteristic to, for example, laser lines. It is also within the scope of the invention provide an etalon for use in an interferometer, wherein the etalon has a prescribed dispersion to control wavelength-dependent fringe shifts.

In accordance with the invention, the etalon 10 transmission peaks are matched to a plurality of spectral lines of interest by making the coating phase dispersive, in a manner described in detail above, so that the coating 12 provides the necessary phase shift at the lth wavelength to compensate for any difference between $2\pi N$ and $\phi$.

As an example, if the etalon 10 is to be matched to solar Fraunhofer lines Eq. (3) is employed to obtain a rugate coating that is a summation of the sinusoidally varying indices of refraction for the various relatively widely spaced and unrelated spectral lines.

Fabrication of the etalon 10 is essentially unchanged from standard rugate (or multilayer) fabrication. For rugates, the following points should be noted. First, the coating starting point (at the substrate) may not be at n0. However, truncation at a zero of the sinc function, or apedization, returns the starting point to zero. Second, the average frequency is essentially unchanged from the midband. Third, because a significant blocking region is generally desired around the etalon line, the rugate reflection band is relatively wide. This indicates that the rugate coating should be relatively thin, in that the bandwidth of the rugate decreases as the rugate thickness is increased for constant $n_1$. A relatively thin rugate coating relaxes fabrication control requirements and decreases stress build-up in the coating. Thus, standard coating fabrication techniques are applicable.

In FIG. 2a the substrate 14 may be comprised of glass, having a thickness on the order of 100 micrometers, and the coating 12 material may be comprised of, by example, $ThF_4$, $ZnSe$, $Si_xO_y$, and $TiO_2$, and of combinations thereof. A presently preferred method of coating deposition employs an evaporative technique wherein the substrate 14 is placed in an evacuated chamber with the selected coating source materials, and where the source materials are controllably evaporated and deposited upon a surface of the substrate 14 so as to provide the desired graded index of refraction variation with depth, or a multi-layered approximation thereof.

The etalons of the invention may be employed, by example, as components of Fraunhofer line discriminators and narrow band filters matched to molecular species, of a type disclosed in the articles that were referred to above, to improve the detection characteristics thereof. The dispersion characteristics may also be selected to compensate for a dispersion induced by a multi-lined laser source. In general, the dispersion characteristics of the coating 12 may be selected as a function of a dispersion caused by the radiation source, and/or a medium through which the radiation propagates, including the material of the substrate 14.

Thus, while the invention has been particularly shown and described with respect to a preferred embodiment thereof, it will be understood by those skilled in the art that changes in form and details may be made therein without departing from the scope and spirit of the invention.

What is claimed is:

1. A method of fabricating an etalon so as to provide a prescribed variation of phase with wavelength in a coating for wavelengths of interest, comprising the steps of:
   providing a substrate that is substantially transparent to radiation having wavelengths of interest; and
   forming a coating upon a surface of the substrate, the step of forming a coating including the step of forming the prescribed variation of phase so as to provide a phase shift for incident radiation that is a function of the wavelengths of interest, wherein said coating includes a rugate coating having a spatially varying index of refraction profile $n(x)$ that is a summation of a plurality of sinusoidal index of refraction profiles, wherein $n(x)$ is given by the expression:

$$n(x) = n_o + \Sigma n_i \sin(K_i x + \phi_i) \, H((n_i K(x - x_o))/(n_o u_i))$$

Where $n_o$ is an average index of refraction through the rugate coating, where $n_i$ is a peak index of refraction variation at the ith wavelength $\lambda_i$, where $K = 4\pi n_o/\lambda_i$, where $\phi_i$ is a starting phase of the index of refraction variation, where x is the distance into the rugate coating, where H is an envelope function or apodizing function or finite extend, and where $\tanh^2 u_i/4$ is the reflectivity of the coating at the ith wavelength.

2. A method as set forth in claim 1 wherein the step of forming forms a rugate coating having a spatially varying index of refraction profile $n(x)$ that is an integral of a plurality of sinusoidal index of refraction profiles, wherein $n(x)$ is given by the expression:

$$n(x) = n_o[1 + \int H(n_i K(x - x_o) / n_o u(K)) \sin(Kx + \phi(K)) dK/K],$$

where $n_o$ is equal to the average index of refraction, $K = 4\pi n_o/\lambda, \theta'$ is the internal angle in the coating and $\lambda$ is the wavelength, where $u(K) = 4\tanh^{-1}[R(K)]^{\frac{1}{2}}$ is a number of cycles in the coating to achieve a desired reflectivity $R(K)$, $n_1$ is the peak deviation of the index from $n_o$ for a single wavelength, where $\phi(K)$ is the phase of reflected light as a function of K, where x is a distance into the coating, and where H is an envelope or apedizing function located at $x_o$ whose extent defines the region of index variation at the wavelength $\lambda$.

3. An etalon for selectively passing spectral lines of interest, comprising:
   a substrate having a first major surface and a second, opposite major surface, and
   a coating formed upon at least one of said major surfaces of said substrate, said coating having a spatially varying index of refraction profile through a depth thereof for providing phase shafts at the wavelength or wavelengths of interest, the profile being selected so as to provide said etalon with a prescribed variation of phase with wavelength that matches a dispersion characteristic of a source of the radiation signal, wherein said coating includes a rugate coating having a spatially varying index of refraction profile $n(x)$ that is a summation of a plurality of sinusoidal index of refraction profiles, wherein $n(x)$ is given by the expression:

$$n(x) = n_o + \Sigma n_i \sin(K_i x + \phi_i) \, H((n_i K(x - x_o))/(n_o u_i))$$

$$n(x) = n_o + \Sigma n_i \sin(K_i x + \phi_i) \, H((n_i K(x - x_o))/(n_o u_i))$$

Where $n_o$ is an average index of refraction through the rugate coating, where $n_i$ is a peak index of refraction variation at the ith wavelength $\lambda_i$, where $K = 4\pi n_o/\lambda_i$, where $\phi_i$ is a starting phase of the index of refraction variation, where x is the distance into the rugate coating, where H is an envelope function or apodizing function or finite extend, and where $\tanh^2 u_i/4$ is the reflectivity of the coating at the ith wavelength.

4. A method as set forth in claim 3 wherein said coating includes a rugate coating having a spatially varying index of refraction profile $n(x)$ that is an integral of a plurality of sinusoidal index of refraction profiles, wherein $n(x)$ is given by the expression:

$$n(x) = n_o[1 + \int H(n_i K(x - x_o) / n_o u(K)) \sin(Kx + \phi(K)) dK/K],$$

where $n_o$ is equal to the average index of refraction, $K = 4\pi n_o/\lambda, \theta'$ is the internal angle in the coating and $\lambda$ is the wavelength, where $u(K) = 4\tanh^{-1}[R(K)]^{\frac{1}{2}}$ is a number of cycles in the coating to achieve a desired reflectivity $R(K)$, $n_1$ is the peak deviation of the index from $n_o$ for a single wavelength, where $\phi(K)$ is the phase of reflected light as a function of K, where x is a distance into the coating, and where H is an envelope or apedizing function located at $x_o$ whose extent defines the region of index variation at the wavelength $\lambda$.

5. Apparatus for detecting radiation having wavelengths of interest comprising:

an etalon; and detector means, said etalon disposed for receiving and transmitting therethrough radiation at a wavelength or wavelengths of interest, said etalon including a substrate and a dispersive coating, said substrate having a first major surface and second, opposite major surface, the radiation being incident upon said first major surface, and said dispersive coating formed upon at least one of said major surfaces of said substrate, said dispersive coating having a spatially varying index of refraction profile through a depth thereof for providing phase shifts at the wavelength or wavelengths of interest, the profile being selected to match a desired dispersive characteristic of a source of a radiation signal having the wavelength or wavelengths of interest; and said detector means disposed relative to said etalon for detecting a presence of radiation at the wavelength or wavelengths of interest that passes through said etalon;

said detector means disposed relative to said etalon for detecting a presence of radiation at the wavelength or wavelengths of interest that passes through said etalon;

wherein said dispersive coating includes a rugate coating having a spatially varying index of refraction profile $n(x)$ that is a summation of a plurality of sinusoidal index of refraction profiles, wherein $n(x)$ is given by the expression:

$$n(x) = n_o + \Sigma n_i \sin(K_i x + \phi_i) \, H((n_i K(x - x_o))/(n_o u_i))$$

Where $n_o$ is an average index of refraction through the rugate coating, where $n_i$ is a peak index of refraction variation at the ith wavelength $\lambda_i$, where $K = 4\pi n_o/\lambda_i$, where $\phi_i$ is a starting phase of the index of refraction variation, where x is the distance into the rugate coating, where H is an envelope function or apodizing function or finite extend, and where $\tanh^2 u_i/4$ is the reflectivity of the coating at the ith wavelength.

* * * * *